Jan. 25, 1938.  R. W. HENDRICK  2,106,503
AUTOMOBILE CARRIER FOR LENGTHY ARTICLES
Filed Feb. 6, 1937  3 Sheets—Sheet 1
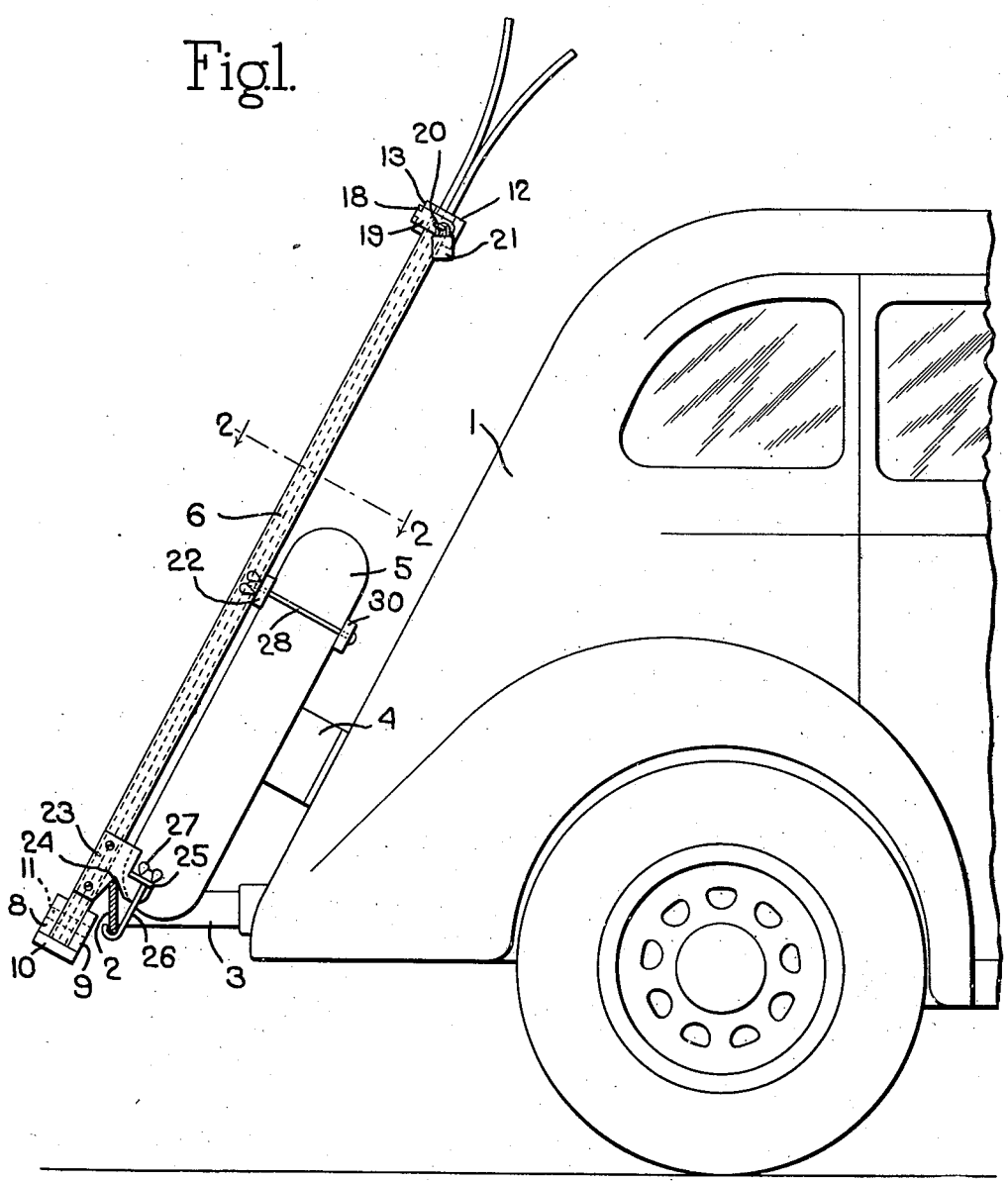
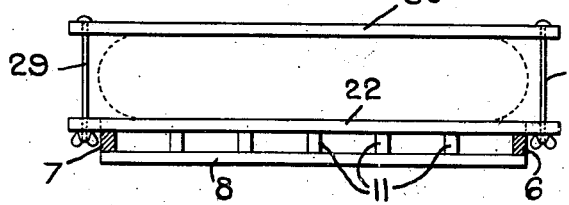
Inventor.
Robert W. Hendrick
by Heard Smith & Tennant
Attys.

Jan. 25, 1938.  R. W. HENDRICK  2,106,503
AUTOMOBILE CARRIER FOR LENGTHY ARTICLES
Filed Feb. 6, 1937   3 Sheets-Sheet 2
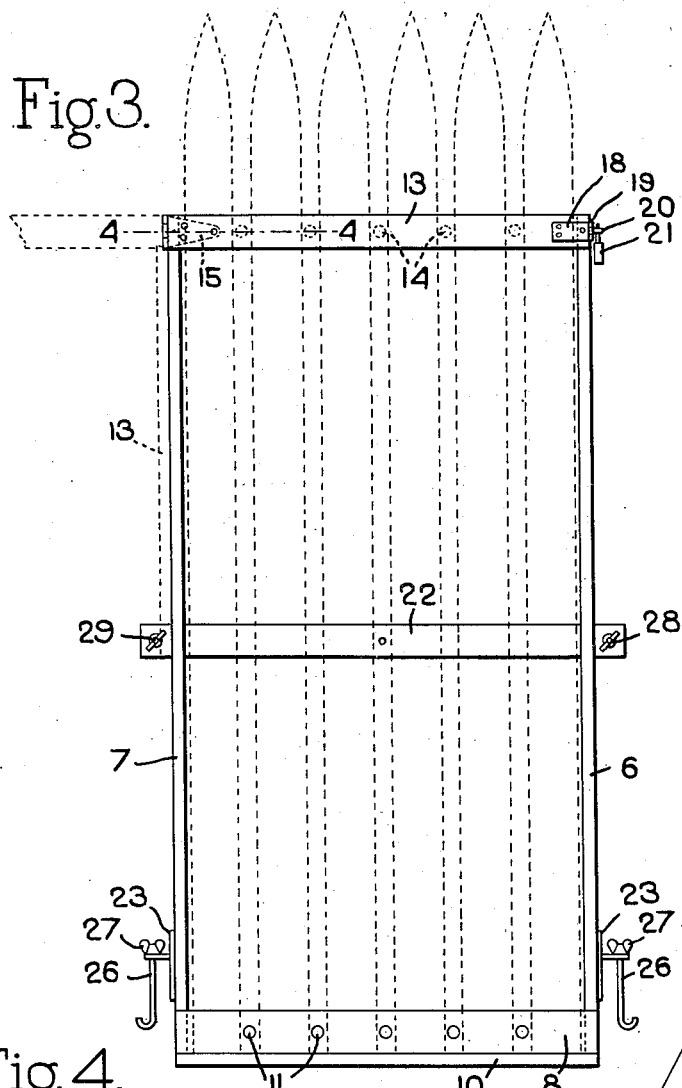
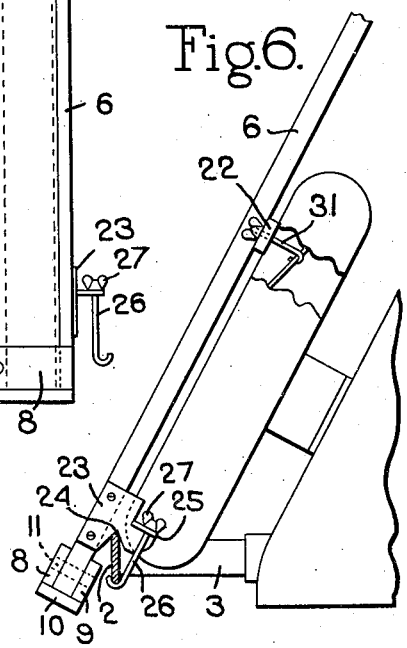
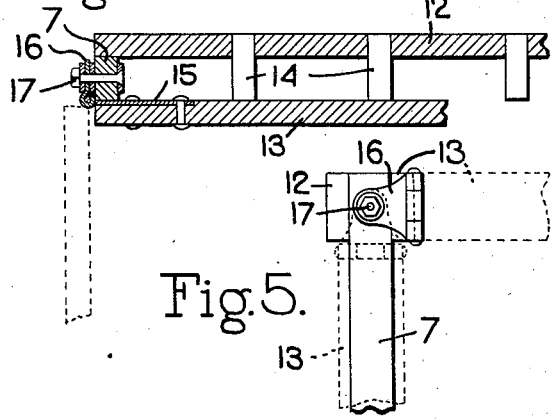
Inventor.
Robert W. Hendrick
by Heard Smith & Tennant.
Attys.

Jan. 25, 1938. R. W. HENDRICK 2,106,503
AUTOMOBILE CARRIER FOR LENGTHY ARTICLES
Filed Feb. 6, 1937 3 Sheets-Sheet 3
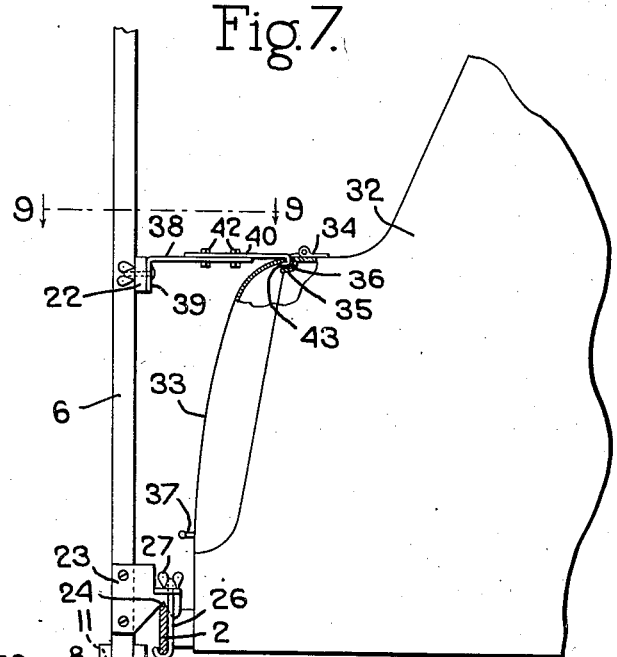
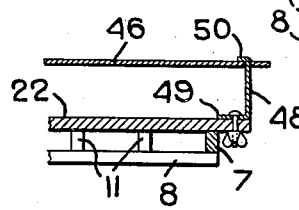
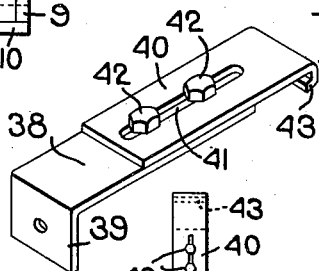
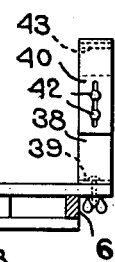
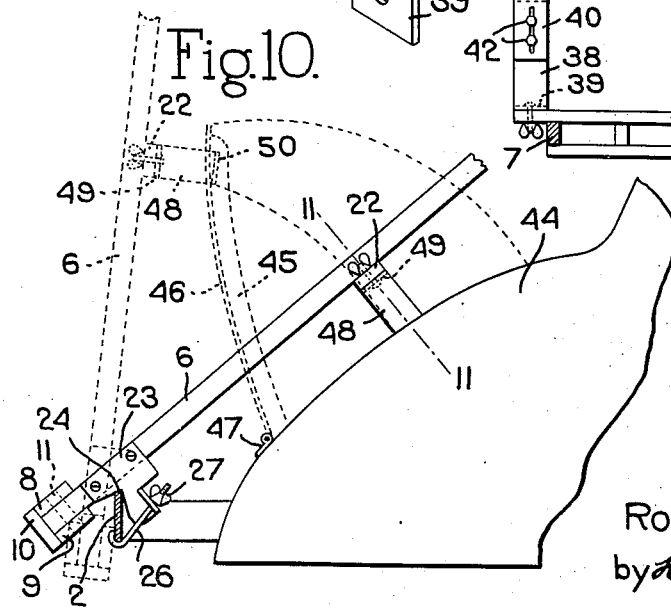
Inventor.
Robert W. Hendrick
by Heard Smith & Tennant.
Attys.

Patented Jan. 25, 1938

2,106,503

UNITED STATES PATENT OFFICE 2,106,503

AUTOMOBILE CARRIER FOR LENGTHY ARTICLES

Robert W. Hendrick, Newtonville, Mass.

Application February 6, 1937, Serial No. 124,412

5 Claims. (Cl. 224—29)

This invention relates to carriers for lengthy articles, and the object thereof is to provide a carrier which may be mounted upon a vehicle, such as an automobile, and more particularly upon the rear end of the usual pleasure type of automobile.

The carrier while adapted for other uses is more especially designed for the purpose of enabling winter sport appliances of considerable length, such as skis, ski poles, toboggans, and the like, to be conveniently carried upon the rear end of an automobile in such manner that they will be protected from injury during transportation and for the purpose of avoiding the necessity of strapping such articles upon the running board or other parts of the automobile in positions in which they would interfere with the proper manipulation of the doors of the automobile, etc.

A further object of the invention is to provide a carrier of the type described which will enable the articles to be assembled conveniently in the carrier and from which they can be readily removed when the destination is reached.

A further object of the invention is to provide a carrier of the character above defined which may be readily and detachably secured to various types of vehicles.

A preferred form of carrier and various means for detachably securing the same to the rear end of vehicles of different types are illustrated in the accompanying drawings, in which, Fig. 1 is a side view of the rear end portion of an automobile having a carrier embodying the present invention mounted upon the bumper and the spare wheel of the automobile which is rigidly secured to the rear end of the automobile body;

Fig. 2 is a transverse sectional view of the carrier illustrating the manner in which it is clamped upon the spare tire;

Fig. 3 is a plan view of a preferred form of carrier illustrating in dotted lines several pairs of skis mounted in said carrier and also showing in dotted lines the positions of the locking cross bar which secures the upper end portions of the ski in the carrier;

Fig. 4 is a detail transverse sectional view on lines 4—4 of Fig. 3 of the left hand upper portion of the carrier and illustrating also in dotted lines the position to which the locking cross bar may be moved to permit removal of the skis;

Fig. 5 is a detail view showing the manner in which the locking cross bar is hinged to the side frame and illustrating in dotted lines positions adapted to be assumed by the cross bar when swung upon its pivotal connections;

Fig. 6 is a detail view of a small portion of the rear end of an automobile having a spare wire wheel mounted thereon and illustrating the manner in which the carrier is secured upon the rear bumper and to a spoke of the wire wheel;

Fig. 7 is a view showing a portion of the rear end of an automobile having a baggage compartment provided with a rear door and illustrating the manner in which the carrier is mounted upon the rear bumper and rigidly secured to the body of the automobile by an extensible bracket which is connected at one end to the carrier and at the other end provided with means to engage beneath the edge of the rear door;

Fig. 8 is a perspective view of one of the extensible brackets illustrated in Fig. 7;

Fig. 9 is a detail cross sectional view on lines 9—9 Fig. 7 showing the brackets for connecting the carrier to the rear door of an automobile compartment as mounted upon a cross bar;

Fig. 10 is a detail view showing a portion of the rear end of an automobile which is provided with a rumble seat and illustrating in full lines the luggage carrier mounted at its lower end upon the rear bumper and connected by brackets at a distance therefrom to the side edges of the door which forms the back of the rumble seat and illustrating in dotted lines the manner in which the luggage carrier may be applied to the rear bumper and the rear door of the rumble seat when the rear door of the rumble seat is in open position; and, Fig. 11 is a transverse sectional view on lines 11—11 Fig. 10 viewed downwardly.

A preferred form of my invention is illustrated in Fig. 1 as applied to the rear end 1 of an automobile of the usual type which is provided with a rear bumper 2 mounted on brackets 3 which are secured to the chassis of the vehicle. A stand 4, which is mounted upon the rear end of the vehicle, supports a spare wheel 5 and the carrier is mounted at its lower end upon the rear bumper and is clamped intermediate of its ends upon the spare wheel. The preferred form of carrier which is illustrated in the drawings, and particularly in Figs. 1, 2, 3, and 4, comprises side bars 6 and 7, preferably of wood, which are connected at their lower ends by cross bars 8 and 9 which are secured to the edges of the side bars and an end bar 10 which may be connected to the ends of the side bars and also to the lower edges of the cross bars, thereby forming a channel adapted to provide a socket to receive the lower ends of the articles which are to be mounted in the frame. Spacing members, such as pins 11 desirably are mounted in the cross bars 8 and 9 and extend across the channel, thereby dividing the channel into a series of sockets or compartments to receive the lower ends of pairs of skis, or other narrow articles. The upper ends of the side bars are also connected by cross bars 12 and 13, the lower cross bar 12 desirably having spacing pins 14 mounted in it at intervals corresponding to those of the spacers 11. The spacers 14 desirably engage the under face of the cross bar 13 when in normal position, but may if desired be of sufficient length to extend a short distance into suitable sockets (not shown) in the cross bar 13.

In order to enable the articles to be conveniently introduced into the carrier and readily removed therefrom the cross bar 13 is in the nature of a locking bar hingedly secured at one end to one of the side bars and detachably secured at its other end to the other side bar by means which may be readily detached to permit the cross bar 13 to be swung out of normal locking position to enable the skis, or other articles, to be placed in the carrier or removed therefrom.

In the preferred construction illustrated means are provided which will enable the cross bar to be swung horizontally and then vertically into the positions illustrated in dotted lines in Fig. 3 so that the entire upper area of the interior of the carrier is exposed. In the preferred construction illustrated a strap hinge connects one end of the cross bar 13 to the end portion of the side bar 7. As illustrated one of the straps 15 of the hinge is rigidly secured to the cross bar 13 and the other strap 16 of the hinge is pivotally mounted upon a bolt or stud 17 which extends through the side bar 7 intermediate of the width thereof. The opposite end of the cross bar 13 desirably is provided with a hasp 18 having a slotted hinge section 19 which is adapted to engage over a staple 20 and rigidly secured thereupon by a padlock 21. By reason of this construction the cross bar 13 may be fixedly secured in the locked position illustrated in full lines in Fig. 3 and Fig. 4. When it is desired to remove the locking cross bar from such position the padlock 21 may be removed, the hasp opened to disengage it from the staple 20 and the cross bar swung outwardly upon its hinge to substantially vertical position with respect to the side bar 7. By reason of the pivotal connection of the strap 16 to the side bar 7, the cross bar may be then swung down vertically alongside and in proximity to the side bar 7, as illustrated in Figs. 3, 4, and 5, so that it will not project outwardly in any direction. When thus positioned the entire upper portion of the interior of the carrier is exposed and the skis or other articles may be readily introduced into the carrier or removed therefrom.

Desirably the carrier is provided with an intermediate cross bar 22 which is secured to the under edges of the side bars 6 and 7 and which desirably projects beyond the outer faces of the side bars. When such an intermediate bar is used the locking bar 13 when swung down alongside the side bar 7 may rest upon the cross bar 22.

The cross bar 22 may be so positioned with respect to the length of the side bars that it may be employed as a member of the locking device for securing the carrier to the rear end of the automobile.

Desirably, but not necessarily, means are provided for supporting the carrier upon the rear bumper of the automobile. In the particular construction illustrated metal brackets 23 are secured to each of the side bars 6 and 7 adjacent their lower ends. Each of these brackets desirably is in the form of a metal plate provided with a V-shaped notch 24 to engage the upper edge of the rear bumper, the upper portion of the bracket being cut and a flange 25 bent outwardly to form an extension which is provided with a suitable hole through which a hooked bolt 26 is inserted in such manner that the hook will engage the lower edge of the bumper and the winged nut 27 of the bolt engage the upper surface of the flange 25. Obviously when the nut 27 is screwed up the bracket will be clamped firmly upon the rear bumper.

Means are illustrated in Figs. 1, 2, and 6, for securing the carrier intermediate of its ends to the spare wheel which is rigidly mounted upon the rear end of the automobile. In the construction illustrated in Figs. 1 and 2, the intermediate cross bar 22, which projects beyond the side frames 6 and 7, is provided with bolts 28 and 29 which extend through a preferably wooden clamping bar 30 which is adapted to engage the under face of the rear wheel 5. The bolts 28 and 29 are provided with suitable winged nuts by means of which the bolts may be tightened to clamp the carrier firmly upon the spare wheel. By reason of this construction the carrier is supported at its lower end upon the bumper and is clamped intermediate of its ends firmly against the rear wheel so that it assumes an inclined position, as illustrated in Fig. 1.

It will be noted that a pair of skis may be mounted in each compartment or space between the separators of the carrier, as illustrated in Figs. 1 and 3, and the width of the side bars desirably is such that when the skis are thus positioned they will be so clamped as not to rattle, or if desired one or both of the upper cross bars may be provided with a suitable felt or other cushioning lining to hold the skis more firmly in position and prevent vibration thereof.

Where a wire spare wheel is employed a similar hooked bolt 31 may be mounted in approximately the center of the intermediate cross bar 22 and hooked around a spoke of the wheel, as illustrated in Fig. 6. When the winged nut of the hooked bolt 31 is screwed up the carrier will be held in substantially the same position as illustrated in Fig. 1.

The ski carrier may also be mounted upon the rear end of an automobile having a compartment to receive the spare wheel, suit cases, and other luggage. In the construction illustrated in Fig. 7 the rear end portion 32 of the automobile is provided with such a compartment which is closed by a door 33 which is pivotally connected at its upper end to the body of the automobile by a pair of hinges 34 which usually are secured to the body at a substantial distance from the rear edge of the door, the body having a downwardly offset flange 35 which extends beneath the upper edge of the door with a padding 36 of felt or other material, sealing the space between the flange and the edge of the door. The door is provided at its lower end with a locking handle 37. In this construction the lower end of the carrier desirably is mounted upon the rear bumper 2 by brackets and hook bolts similar to those illustrated in Figs. 1 and 6 and heretofore described, and the intermediate portion of the carrier is connected to the upper edge of the door 33 by suitable brackets mounted upon the carrier and having hook-shaped ends which engage over the upper edge of the rear door. These brackets may be in the form of flat plates one end of which is secured to the intermediate cross bar 22 or to the side frames and have hooked ends which engage over and beneath the upper edge of the door.

In order properly to mount the ski carrier upon the rear bumpers of different types of cars and in a desired upwardly and forwardly inclined position these brackets are made in longitudinally adjustable sections or arms having at their ends means to engage beneath the edge of the door of the rear compartment, as illustrated in Figs. 7 and 8. In this construction each bracket comprises a flat plate 38 having a flanged end 39 which is bolted, or otherwise secured to the intermediate cross bar 22, as illustrated in Figs. 7 and 9, or to the side frame, and a complementary flat plate 40 provided with a longitudinal slot 41 through which bolts 42 extend into suitable apertures in the plate 38. The end of the plate 40 is provided with a hook-shaped flange 43 which is adapted to engage over the upper edge of the door 33, as illustrated in Fig. 7. By reason of the fact that the hinge 34 for the door is located at a distance from the upper edge of the door, the hook-shaped ends of the bracket 43 may be readily engaged over the upper edge of the door when it is partly opened and when the door is closed the packing 36 will yield sufficiently to enable the door to be closed without substantial binding. The hooked end 43 of the plate 40 will, however, be clamped by the door when closed in such manner as to prevent vibration and the rattling noise which would be caused thereby.

The invention is illustrated in Fig. 10 as applied to the rear end of an automobile having a rumble seat. In this construction the rear end of the automobile 44 has the usual compartment provided with a rumble seat the back of which is formed by a cushion 45 secured to the door 46 of the car which is pivoted at its lower end upon a hinge 47. The usual lock (not shown) is provided at the upper end of the door. In this construction the bracket plates 23 of the carrier rest upon the rear bumper 2 and are clamped to it by hooked bolts 26 as above described and the carrier is provided at a suitable distance from its lower end with brackets 48 formed of flat metal plates each having at one end a flange 49 which is bolted to the intermediate cross bar 22 and at its other end a short flange 50 which is adapted to engage beneath the side edge of the door 46. The brackets are secured to the intermediate cross bar 22 and are so spaced apart that the flanges 50 will engage beneath the opposite edges of the door and when the door is locked will be clamped between the door and the offset portion of the car body which enables the door to lie flush with the body of the automobile.

The cross bar 22 in this construction is secured to the side bars 6 and 7 in such position that the flanges 50 of the bracket may be engaged over the edges of the door when it is in open position, as illustrated in dotted lines in Fig. 10, and the carrier then lowered until the bracket 23 rests upon the upper edge of the bumper. When the door is swung to closed position the brackets 50 will move in an arc downwardly and engage the edges of the door at a suitable distance from the upper edge thereof so that when the door is locked the carrier will be rigidly held in an inclined position, such as illustrated in full lines in Fig. 10. Obviously the brackets may be longitudinally adjustable as shown in Fig. 8 in order to enable the ski carrier to be mounted on the rear bumper at a desired upwardly and forwardly extending position.

By reason of the constructions above described it will be apparent that the carrier is so constructed that it may be applied to various types of automobiles and that by properly adjusting the supporting and locking elements for the carrier it may be assembled upon any type of automobile in such manner as to permit the carrying of lengthy articles without interference with the normal use of the automobile and without extending in any direction which would interfere with access to the interior of the automobile, or which would increase the hazard of driving.

It will be understood that the embodiments of the invention particularly shown and described herein are of an illustrative character and are not restrictive of the meaning and scope of the following claims.

It will also be understood that while the invention has been particularly described as a carrier for winter sport appliances, it may be used to support any type of lengthy article within its capacity.

Having thus described the invention, what is claimed as new, and desired to be secured by Letters Patent, is:

1. A carrier, for lengthy articles, adapted to be mounted upon the rear end of an automobile having at its rear end a compartment provided with a cover hingedly connected thereto, comprising a frame having parallel side bars connected at their lower ends by means to engage and support the lower end of the article, means for releasably supporting the upper portions of said articles, means for detachably securing the lower end of the carrier to the rear bumper of the vehicle, and brackets mounted upon said frame at a distance from the lower end thereof having means to engage beneath the edge of said cover and of such length as to hold the carrier in an upwardly extending position when the cover is closed.

2. A carrier, for lengthy articles, adapted to be mounted upon the rear end of an automobile having at its rear end a compartment provided with a cover hingedly connected thereto, comprising a frame having parallel side bars connected at their lower ends by means to engage and support the lower end of the article, means for releasably supporting the upper portions of said articles, means for detachably securing the lower end of the carrier to the rear bumper of the vehicle, and brackets mounted upon said frame at a distance from the lower end thereof provided with longitudinally adjustable arms having means to engage beneath the edge of said cover and of such length as to hold the carrier in a desired upwardly extending position when the cover is closed.

3. A carrier, for lengthy articles, adapted to be mounted upon the rear end of an automobile comprising a frame having side bars connected at their lower ends by cross bars to form a channel to receive one end of the article and at their upper ends by complementary cross bars one of which is fixedly secured to the under edge of the side bars, a hinge having a strap fixedly secured to one end of the other cross bar, means pivotally connecting the other strap of said hinge to one side bar whereby said cross bar may be swung to a position at right angles to the plane of the carrier and then swung into parallelism with and proximity to the side bar to which it is hinged, and means secured to the other end of said locking cross bar for detachably securing it to the other side bar, and means for detachably connecting said carrier to members rigid with the rear end of the automobile.

4. A ski carrier, adapted to be mounted upon the rear end of an automobile, comprising a frame having side bars connected at their lower ends by cross bars forming a channel to receive the lower ends of the skis, means extending across said channel dividing said channel into a plurality of sockets, complementary cross bars connecting the upper ends of said side bars, one of which is fixedly secured to the under edge of the side bars, and provided with spacing means corresponding to the spacing means of said channel, and the other of which is provided at one end with a strap hinge, one of the straps of which is pivotally mounted upon one of the side bars and is provided at its other end with means adapted to be detachably locked to the other side bar, and means for detachably securing said carrier to members rigid with the rear end of the automobile.

5. A carrier, for lengthy articles, adapted to be mounted upon the rear end of an automobile having a compartment provided with a hinged cover, comprising a frame having side bars connected at their lower ends by cross bars forming a channel to receive the lower ends of the skis, means extending across said channel dividing said channel into a plurality of sockets, complementary cross bars connecting the upper ends of said side bars, one of which is fixedly secured to the under edges of the side bars, and provided with spacing means corresponding to the spacing means of said channel, a hinge having a strap fixedly secured to one end of the other cross bar, means pivotally connecting the other strap of said hinge to one side bar whereby said cross bar may be swung to a position at right angles to the plane of the carrier and then swung into parallelism with and proximity to the side bar to which it is hinged, and means secured to the other end of said locking cross bar for detachably securing it to the other side bar, brackets secured to the lower end of said side bars, means for detachably securing said side bars to the rear bumper of the automobile, and brackets mounted on said frame at a distance from the lower end thereof having means to engage the edge of said cover and of such length as to hold the carrier in an upwardly extending position.

ROBERT W. HENDRICK.